(No Model.) 2 Sheets—Sheet 2.
L. WEST.
APPARATUS FOR THE MANUFACTURE OF GLASS.
No. 499,624. Patented June 13, 1893.
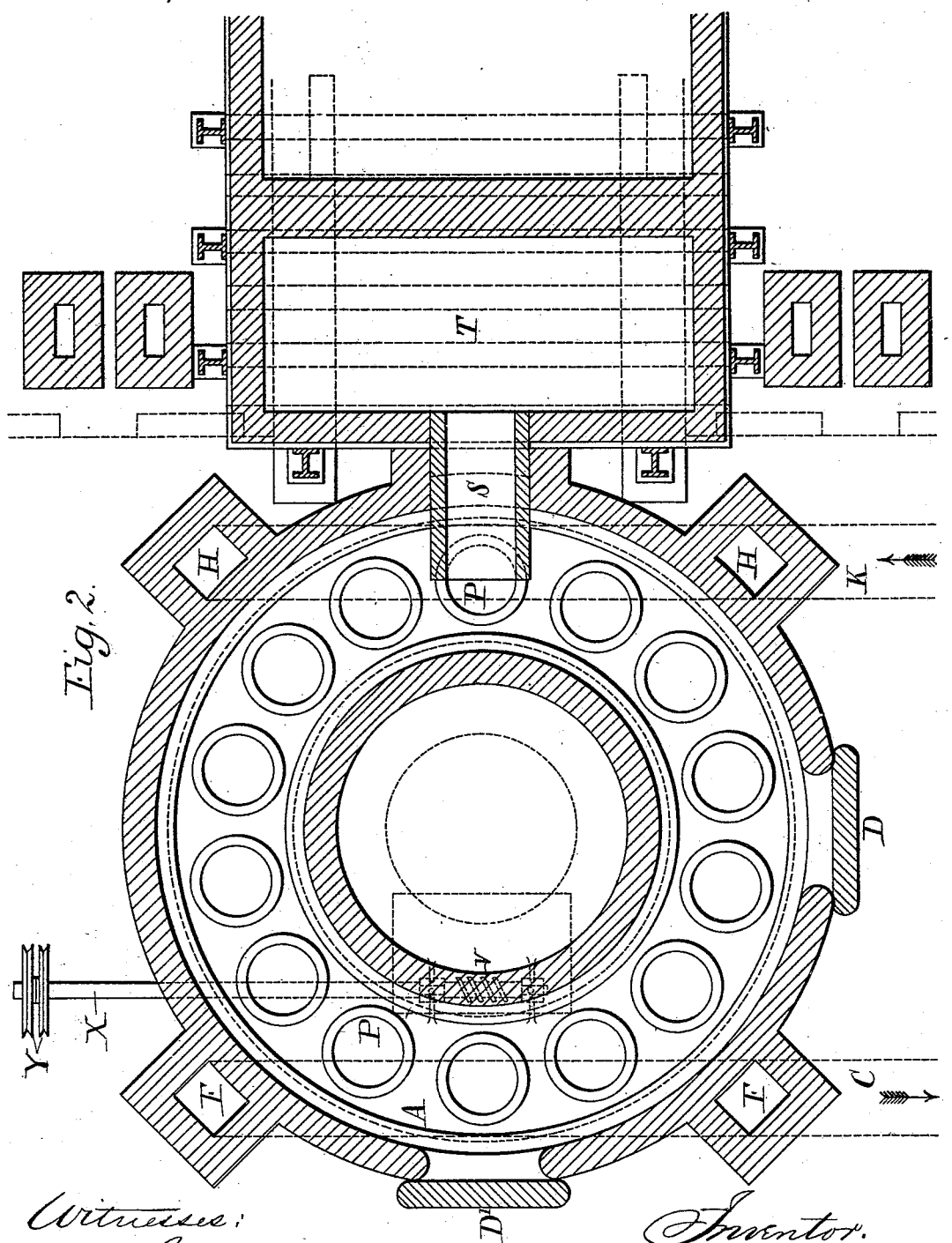

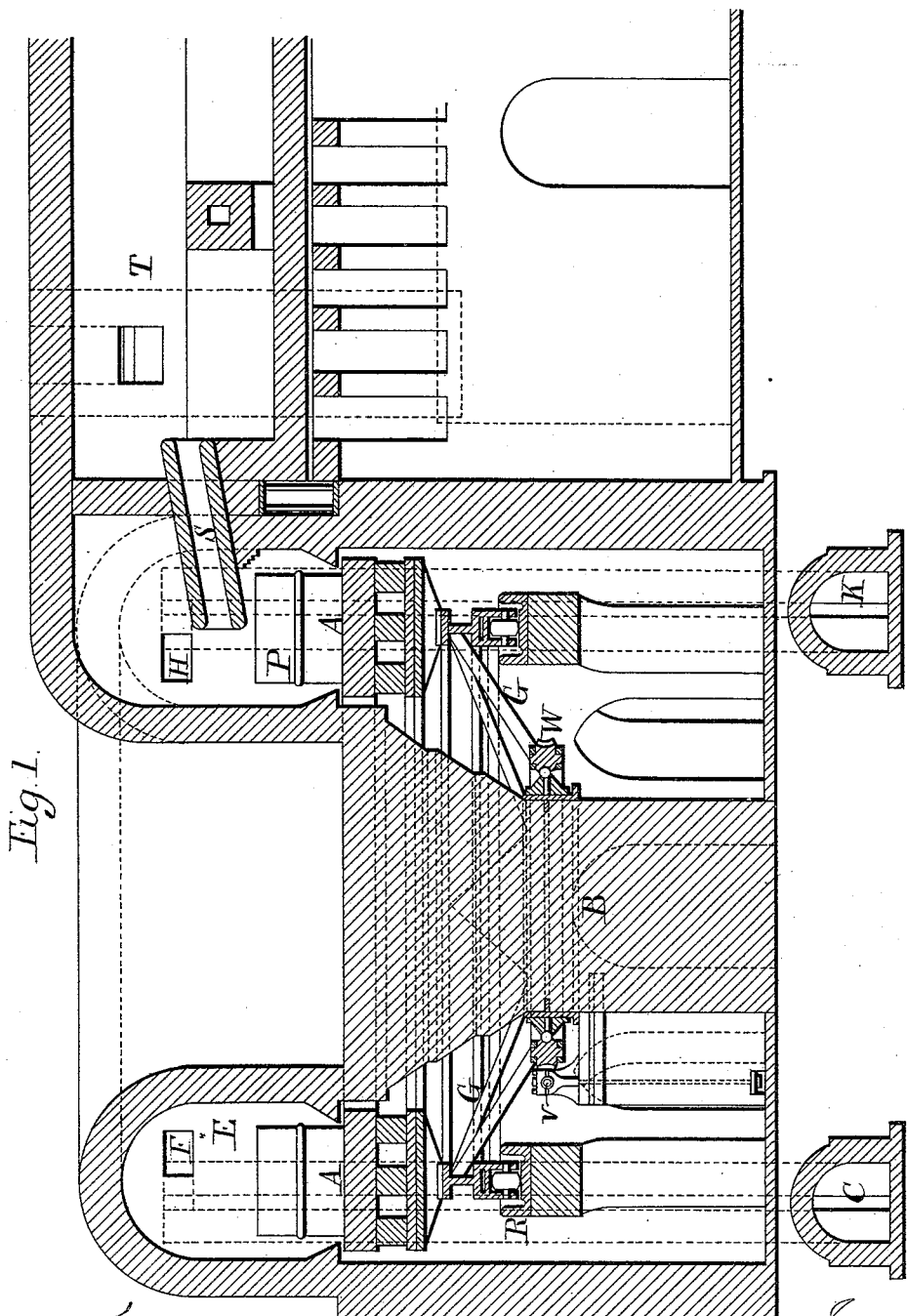

UNITED STATES PATENT OFFICE.

LEONARD WEST, OF ST. HELEN'S, ENGLAND.

APPARATUS FOR THE MANUFACTURE OF GLASS.

SPECIFICATION forming part of Letters Patent No. 499,624, dated June 13, 1893.

Application filed September 21, 1892. Serial No. 446,433. (No model.) Patented in England November 24, 1891, No. 20,415.

*To all whom it may concern:*

Be it known that I, LEONARD WEST, engineer, a subject of the Queen of England, residing at Ravenhead, St. Helen's, in the county of Lancaster, England, have invented new and useful Improvements in the Manufacture of Plate and other Glass and Apparatus Therefor, (for which I have obtained Letters Patent in Great Britain, dated November 24, 1891, No. 20,415,) of which the following is a specification.

Usually, in the manufacture of plate glass and glass of the finer qualities, the glass material is fused and refined in pots.

My invention relates to means of effecting the fusion and part of the refining in tanks and completing the refining in pots. For this purpose I provide an annular furnace chamber in which I cause to revolve step by step an annular turntable carrying a number of glass pots arranged on it. At one side I make a communication by which molten glass flows by gravity from a tank to charge one of the pots, and I then move the turntable onward advancing another pot which is also charged and so on successively. The charged pots pass round to another part of the chamber subject to a regulated temperature until their contents are settled and refined. I then remove each pot and cast its contents, substituting an empty pot to be charged in its turn. In order to maintain and regulate the temperature in the chamber, I may admit to it a portion of the hot products of combustion from the tank, or from a separate furnace.

Figure 1 of the accompanying drawings is a vertical section and Fig. 2 is a sectional plan of part of the tank and the annular furnace arranged to operate according to my invention.

T is part of the glass melting tank. S is a spout leading from it to charge one of the pots P; a number of which are placed upon the annular turntable A. This turntable is carried on rollers running on a circular track or rail R and is connected by diagonals G to a ring or wheel W which is fitted to revolve around the central column B of the furnace structure. The turntable and pots revolve within an arched annular chamber E from which several flues F lead to the chimney flues C. Other flues H are connected by a flue K to a furnace so that flame can be caused to circulate through the chamber E to maintain the required heat.

D D' are doors by which full pots can be withdrawn and empty pots can be introduced.

The turn-table is intermittently rotated by any suitable mechanism, but in the example illustrated by the drawings this is accomplished by making the ring or wheel W in the form of a worm-wheel with which engages a worm V on a shaft X which extends to the exterior of the furnace, and is provided with suitable pulleys Y, adapted to be put in motion from time to time by any suitable motor working sufficiently long to turn the turn-table the distance from one pot to another and then stop, whereby there are intervals of rest during which a pot is being filled and other pots are being taken out or put in.

Having thus described the nature of my invention and the best means I know for carrying the same into practical effect, I claim—

The combination with a glass tank, and a furnace chamber, of a rotating turn-table arranged in the furnace-chamber and carrying a series of pots, and suitable means for rotating said turn-table on its axis, substantially as described.

In testimony whereof I have signed my name to this specification, in the presence of two subscribing witnesses, this 3d day of September, A. D. 1892.

LEONARD WEST.

Witnesses:
JAMES SHORPPLELEORLAUN,
ENOCH MARSH.